US009069357B2

(12) United States Patent
Hsu et al.

(10) Patent No.: US 9,069,357 B2
(45) Date of Patent: Jun. 30, 2015

(54) NAVIGATION DEVICE AND METHOD FOR AUTO-DOCKING OF A ROBOT

(71) Applicant: ASUSTeK COMPUTER INC., Taipei (TW)

(72) Inventors: Cheng-Chung Hsu, Taipei (TW); Ming-lu Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 156 days.

(21) Appl. No.: 13/911,083

(22) Filed: Jun. 6, 2013

(65) Prior Publication Data

US 2013/0338853 A1 Dec. 19, 2013

Related U.S. Application Data

(60) Provisional application No. 61/659,987, filed on Jun. 15, 2012.

(30) Foreign Application Priority Data

May 8, 2013 (CN) .......................... 2013 1 0167301

(51) Int. Cl.
*G05D 1/02* (2006.01)
*B25J 9/00* (2006.01)

(52) U.S. Cl.
CPC .................. *G05D 1/028* (2013.01); *B25J 9/003* (2013.01); *G05D 1/0225* (2013.01); *G05D 1/0234* (2013.01)

(58) Field of Classification Search
CPC ..................................................... B25J 9/0003
See application file for complete search history.

(56) References Cited

U.S. PATENT DOCUMENTS

| 4,829,442 | A | * | 5/1989 | Kadonoff et al. ............... 701/23 |
| 4,905,315 | A | * | 2/1990 | Solari et al. ................... 318/640 |
| 5,231,483 | A | * | 7/1993 | Sieber et al. .................. 348/169 |
| 6,504,610 | B1 | * | 1/2003 | Bauer et al. .................... 356/399 |
| 2004/0158354 | A1 | * | 8/2004 | Lee et al. ...................... 700/245 |
| 2004/0158357 | A1 | * | 8/2004 | Lee et al. ...................... 700/258 |
| 2005/0156562 | A1 | * | 7/2005 | Cohen et al. .................. 320/107 |

(Continued)

FOREIGN PATENT DOCUMENTS

| CN | 101446832 A | 6/2009 |
| CN | 101524257 A | 9/2009 |

OTHER PUBLICATIONS

K. Kim, H. Choi, S. Yoon, K. Lee, H. Ryu, C. Woo, and Y. Kwak, "Development of Docking System for Mobile Robots Using Cheap Infrared Sensors," 1st International Conference on Sensing Technology, New Zealand, Nov. 2005.*

*Primary Examiner* — Thomas G Black
*Assistant Examiner* — Peter D Nolan
(74) *Attorney, Agent, or Firm* — CKC & Partners Co., Ltd.

(57) ABSTRACT

A robot device includes a base station and a robot. The base station transmits guiding signals. The robot receives the guiding signal by three receivers. A receiver is disposed at the robot, and the other two receivers are disposed at the right and left of the receiver at different angles. The robot bypasses toward right or left according to the guiding signal received by the receivers. When the strength of the guiding signal received by the central receiver decreases, the robot stops bypassing to spin and searches the guiding signal again till the strength of the guiding signal received by the central receiver is a maximum value. The robot has a fine tuning to return to the base station to have a charge.

15 Claims, 10 Drawing Sheets

(56) References Cited

U.S. PATENT DOCUMENTS

| | | | |
|---|---|---|---|
| 2005/0231156 A1* | 10/2005 | Yan | 320/107 |
| 2006/0217844 A1* | 9/2006 | Saeki | 700/258 |
| 2008/0004751 A1* | 1/2008 | Chung et al. | 700/258 |
| 2008/0012518 A1* | 1/2008 | Yamamoto | 318/568.12 |
| 2010/0324736 A1* | 12/2010 | Yoo et al. | 700/259 |

* cited by examiner

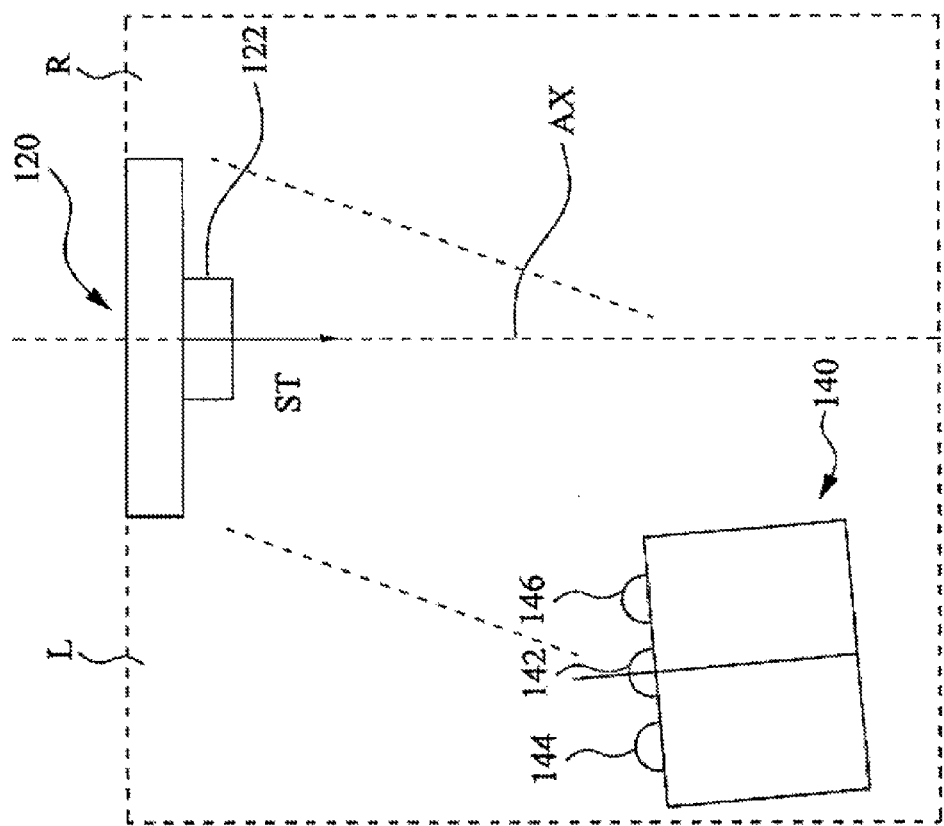

NAVIGATION DEVICE AND METHOD FOR AUTO-DOCKING OF A ROBOT

CROSS-REFERENCE TO RELATED APPLICATION

This application claims the priority benefits provisional application Ser. No. 61/659,987 filed on Jun. 15, 2012 and of CHINA application serial no. 201310167301.9, filed on May 8, 2013 The entirety of each of the above-mentioned patent applications is hereby incorporated by reference herein and made a part of this specification.

BACKGROUND OF THE INVENTION

1. Field of the Invention

This disclosure relates to a robot device and, more particularly, to a navigation device and method for guiding a robot back to a base station.

2. Description of the Related Art

With the development of a robot, an auto-docking function of the robot is becoming more and more important. A conventional base station includes a single signal transmitter for transmitting a guiding signal; the robot also includes a single signal receiver and a signal receiving circuit for getting the position information of the base station.

However, the conventional signal receiving and transmitting circuits of the base station and the robot are rather complicated, and the method fix positioning consumes much time. Moreover, multiple signal receivers and signal transmitters have large power consumption and high cost. Additionally, since the robot is positioned by the absolute value of the received signal strength, the attenuation of the transmitted signal may cause a misjudgment.

BRIEF SUMMARY OF THE INVENTION

A robot device is provided in this disclosure. The robot device includes a base station and a robot. The base station is used to transmit a guiding signal. The robot includes a first receiver, to second receiver and a third receiver for receiving the guiding signal. The second receiver and the third receiver are disposed at the left and the right of the first receiver at different angles respectively.

The robot bypasses towards right or left according to the guiding signal received by the second receiver and the third receiver. In bypassing, the receivers of the robot receives the guiding signal continually till the strength of the guiding signal decreases or is reduced to zero, and the robot stops bypassing. After stopping bypassing, the robot spins till the strength of the guiding signal received by the first receiver is a maximum value, the robot is very close to the base station and the robot can return to the base station by fine-tuning.

When the robot bypasses, the strength of the guiding signal received by the first receiver decreases (from high to low) or is reduced to zero, the robot stops bypassing. When the strength of the guiding signal received by the second receiver is larger than the strength of the guiding signal received by the third receiver, the robot bypasses toward left. In the process of bypassing, if the strength of the guiding signal received the first receiver increases continuously, it represents that the robot moves in the right direction, and the robot continues bypassing. When the strength of the guiding signal received by the first receiver decreases or is reduced to zero, the robot stops bypassing and stays at a first position. When the robot stays at the first position, the robot spins till the strength of the guiding signal received by the first receiver is a maximum value.

When the strength of the guiding, signal received by the second receiver is smaller than the strength of the guiding signal received by the third receiver, the robot bypasses towards right. In the process of bypassing, if the strength of the guiding signal received by the first receiver decreases, it represents that the robot moves in the wrong direction, the robot stops bypassing, and then the robot automatically changes to bypass towards left. In the bypassing of the robot, if the strength of the guiding signal received by the first receiver increases continuously, it represents that the robot moves in the right direction, the robot continues bypassing till the strength of the guiding signal received by the first receiver decreases or is reduced to zero, the robot stops bypassing and stays at the first position. When the robot stays at the first position, the robot spins till the strength of the guiding signal received by the first receiver is a maximum value.

A method for guiding the robot back to the base station is provided, the method includes that a first receiver, a second receiver and a third receiver of a robot receives a guiding signal transmitted by a base station; the robot determines to bypasses towards right or left according to the guiding signals received by the second receiver and the third receiver; the robot bypasses according to a determined bypassing direction till the strength of the guiding signals received by the first receiver decreases or is reduced to zero, and then the robot stopping bypassing; the robot spins after the robot stops bypassing till the strength of the guiding signal received by the first receiver is a maximum, and then the robot moves towards the base station after the robot stops spinning.

BRIEF DESCRIPTION OF THE DRAWINGS

FIG. 5B is a schematic diagram showing that the robot in FIG. 1 bypasses relative to the base station from a sixth position.

DETAILED DESCRIPTION OF THE EMBODIMENTS

Figure 1:
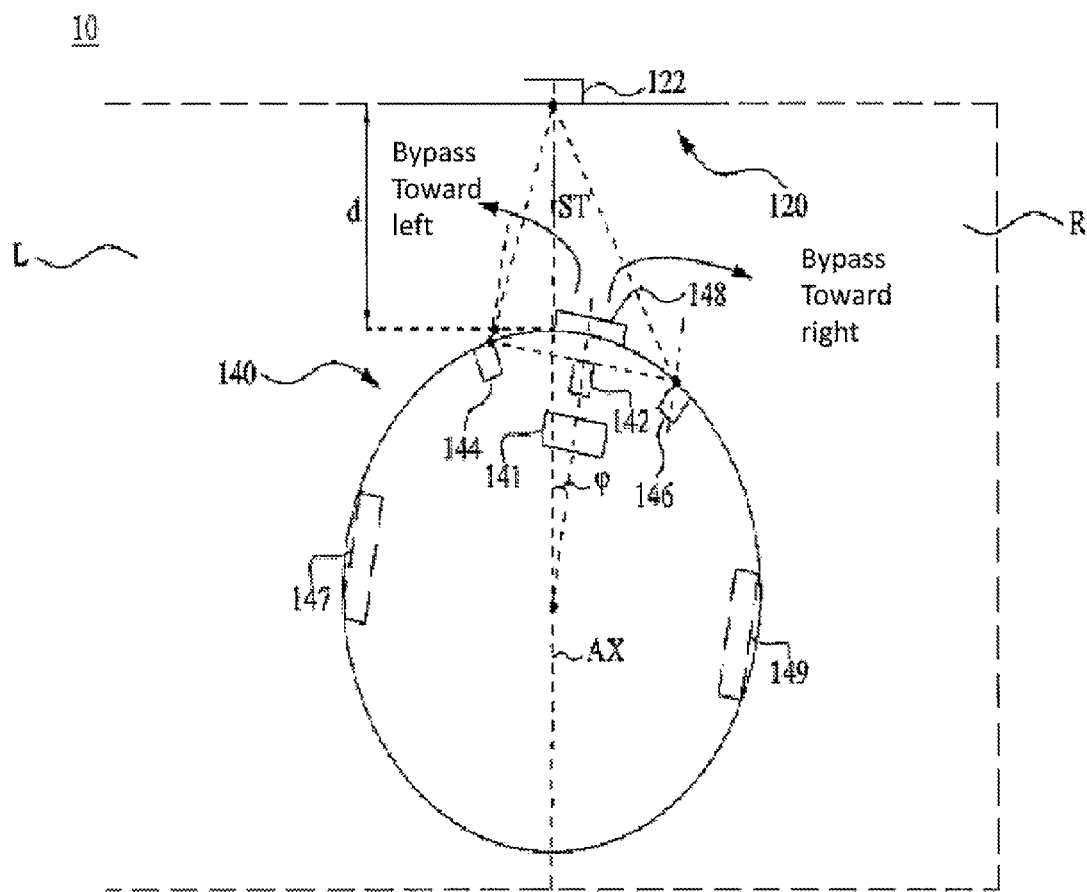
FIG. 1 is a schematic diagram showing a robot device in one embodiment.

FIG. 1 is a schematic diagram showing a robot device. The robot device includes a base station 120 and a robot 140. The base station 120 further includes a transmitter 122 for transmitting a guiding signal ST. The robot 140 includes a first receiver (such as a central receiver 142), a second receiver (such as a right receiver 146) and a third receiver (such as a left receiver 144). The central receiver 142, the left receiver 144 and the right receiver 146 are used to receive guiding signals ST, the left receiver 144 and the right receiver 146 are disposed at the left and right of the robot 140 at different angles, respectively, and the central receiver 142 is disposed at the center of the robot, as shown in FIG. 1. The robot 140 determines a bypass direction according to the guiding signals received by the left receiver 144 and the right receiver 146. When the robot stops bypassing, the robot spins till the guiding signal ST received by the central receiver 142 is a maximum, it represents that the robot is already very close to the base station when the guiding signal ST received by the central receiver 142 is a maximum. At this moment, the robot can return to the base station to have a charge by fine-turning.

In this embodiment, the left receiver 144 and the right receiver 146 are disposed at the left and the right of the robot 140 at different angles relative to the central receiver 142. As a result, the guiding signals ST received by the central receiver 142, the left receiver 144 and the right receiver 146 are corresponding to the front, the left, the right of the robot 140, which is not limited herein. The "front" of the robot 140 may be a direction faced by a part of the robot such as the back of the robot. The three receivers may have receiving pattern of narrow beam, the receiving patterns of the adjacent receivers partly overlap, and the transmitter 122 may have the receiving pattern of narrow beam. The base station 120 also can be used to charge the robot 140, which is not limited herein.

In this embodiment, the robot 140 determines the bypass direction towards left or right according to the guiding signal ST received by the left receiver 144 and the right receiver 146 (it will be illustrated in detail in the embodiments in FIG. 3A, FIG. 3B, FIG. 4A, and FIG. 4B). After the robot 140 determines the bypass direction, the robot 140 bypasses till the strength of the guiding signal received by the first receiver continuously decreases (from high to low) or is reduced to zero, the robot 140 stops moving and stays at a first position. The robot 140 stops bypassing in front of the base station 120 (it will be illustrated in the embodiments in FIG. 3A and FIG. 3B). After the robot 140 stops bypassing, the robot 140 spins till the strength of the guiding signal ST received by the central receiver 142 is a maximum (it will be illustrated in the embodiments in FIG. 3A to FIG. 4B), it represents that the robot is very close to the central position and the base station 120. Thus, the robot 140 can return to the base station 120 to have a charge.

Figure 2:
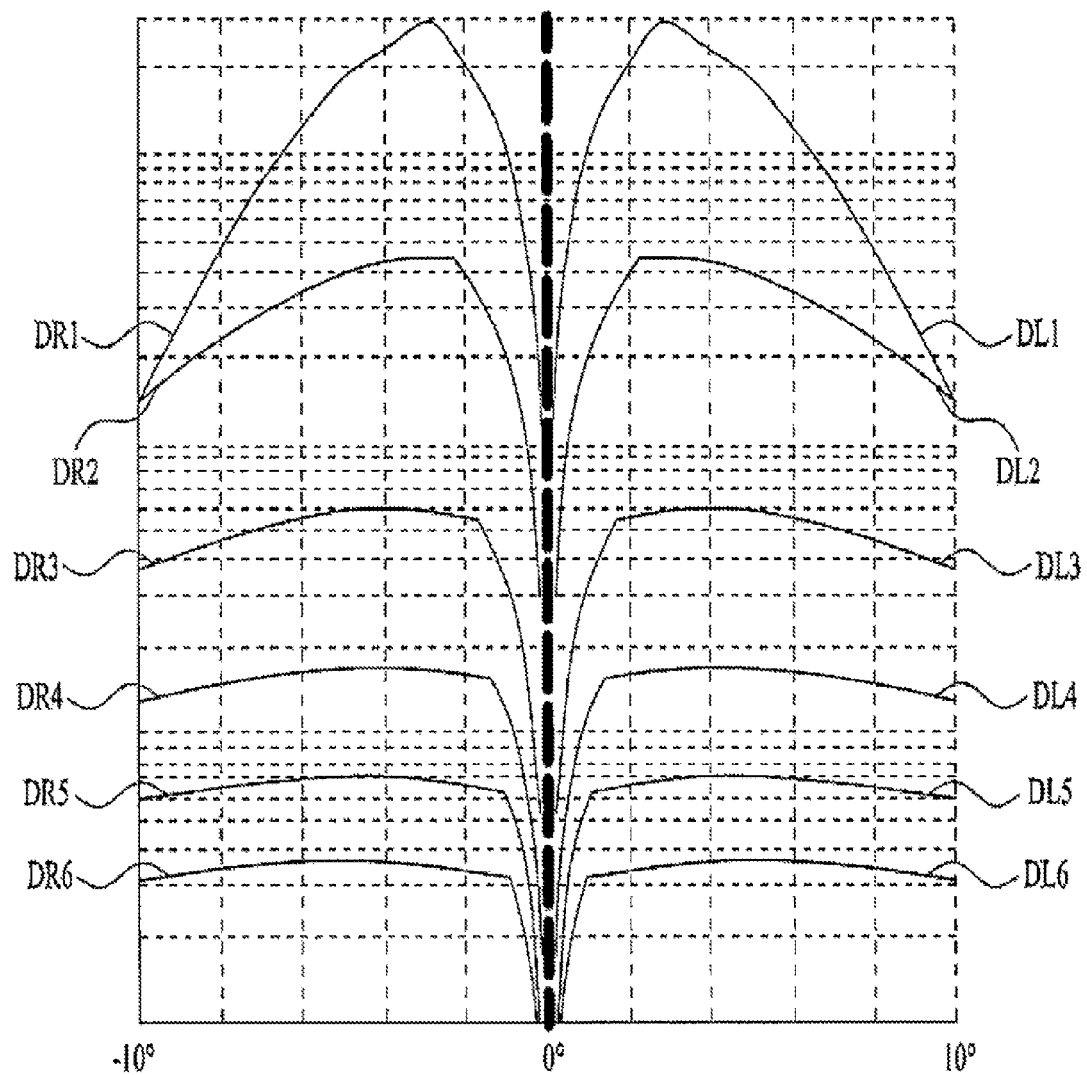
FIG. 2 is a curve showing the strength difference of guiding signals received by a receiver of a robot in FIG. 1 changes relative to the turning offset angle.

FIG. 2 is a curve showing that the strength difference of guiding signals ST received by a receiver of the robot in FIG. 1 changes relative to the turning offset angle ψ. As shown in FIG. 1 and FIG. 2, the curve DL1 to DL6 respectively represent that the robot 140 turn to the right of a virtual central line AX of the base station 120 from different distances (that is the strength of the guiding signal ST received by the left receiver 144 is larger than the strength of the guiding signal ST received by the right receiver 146). The turning offset angle ψ of the robot 140 in FIG. 1 is a positive value, the values of the curve DL1 to DL6 represent the strength value by subtracting the strength of the guiding signal ST received by the right receiver 146 from that of the guiding signal ST received by the left receiver 144. Similarly, the curve DR1 to DR6 represents that the robot 140 turns to the left of the virtual central line AX of the base station 120 from different distances (that is the strength of the guiding signal ST received by the left receiver 146 is greater than the strength of the guiding signal ST received by the right receiver 144). The turning offset angle ψ of the robot 140 in FIG. 1 is a negative value, the values of the curve DL1 to DL6 represents the strength difference by subtracting the strength of the guiding signal ST received by the right receiver 144 from that of the guiding signal ST received by the left receiver 146. Consequently, as shown in FIG. 2, the robot 140 can determine the turning offset situation of the robot 140 according to the strength difference of the guiding signals received by the left receiver 144 and the right receiver 146.

Moreover, when a distance from the robot 140 to the transmitter 122 is d, the curve DL1 to DL6 is corresponding to the different distances d, the distance d corresponding to the curve the DL1 is a minimum, and the distance d corresponding to the curve DL6 is a maximum. As shown in FIG. 2, the smaller the distance d is, the larger the strength difference is, and the strength difference herein is the get by subtracting the strength of the guiding signal ST received by the right receiver 146 from the guiding signal ST received by the left receiver 144. Consequently, the robot 140 can determine the relative position according to the strength difference of the guiding signals received by the left receiver 144 and the right receiver 146. The curve DR1 to DR6 is similar to the curve DL1 to DL6, which is omitted. Based on above, the robot 140 can determines the turning offset situation and the relative position according to the strength difference of the guiding signals received by the left receiver 144 and the right receiver 146.

Figure 3A:
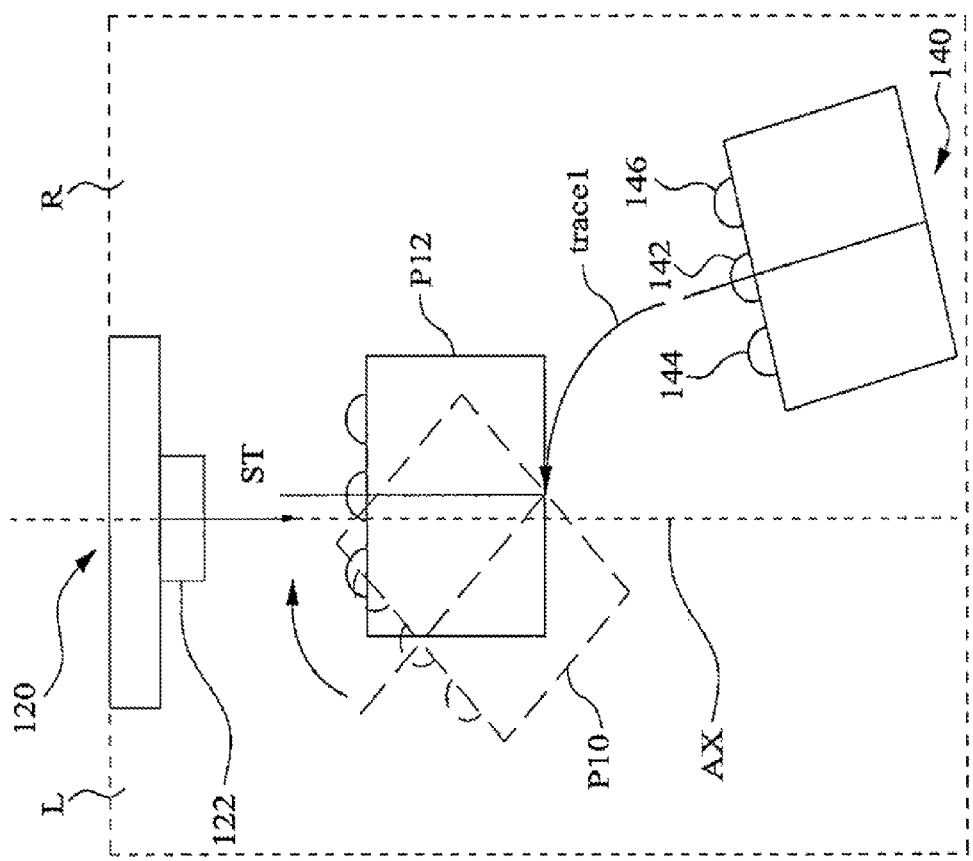
FIG. 3A is a schematic diagram showing that the robot in FIG. 1 bypasses relative to the base station from a first position.
Figure 3B:
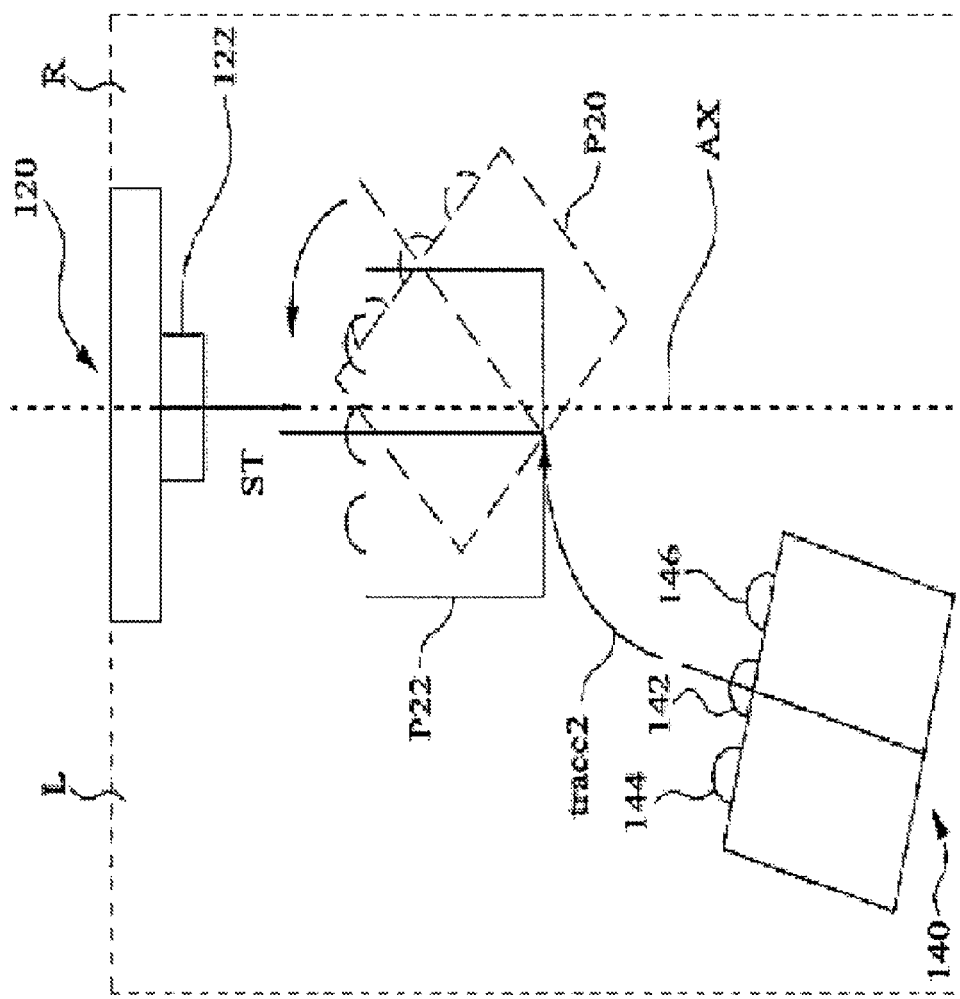
FIG. 3B is a schematic diagram showing that the robot in FIG. 1 bypasses relative to the base station from a second position.

FIG. 3A and FIG. 3B are schematic diagrams showing the robot in FIG. 1 bypasses from a first position and a second position relative to the base station. As shown in FIG. 3A, before the robot 140 moves, when the strength of the guiding signal ST received by the right receiver 146 is larger than the strength of the guiding signal ST received by the left receiver 144 (at this moment, the robot 140 faces the base station 120), the robot 140 bypasses towards left.

In the bypass process of the robot 140, the change of the strength of the guiding signal ST received by the central receiver 142 is continuously detected. As shown in FIG. 3A, when the robot 140 bypasses towards left, the robot 140 is gradually close to the base station 120, the strength of the guiding signal ST received by the central receiver 142 increases gradually (from low to high), it represents that the moving direction of the robot 140 is right and the robot 140 is gradually closer to the base station 120.

Afterwards, when the robot 140 passes the central line in front of the base station 120 and moves on, the strength of the guiding signal ST received by the central receiver 142 decreases (from high to low) or is reduced to zero, it represents that the robot moves in the right direction and the robot is gradually away from the base station. At the time, the robot 140 stops bypassing and stays at a position P10, as shown in FIG. 3A, the position of the robot 140 is toward the left side L of the base station 120, and the position P10 is close to virtual central line AX of the base station 120. After stopping bypassing, the robot 140 spins at the position P10 (such as the direction of the clockwise arrow shown is FIG. 3A), the first receiver (such as the central receiver 142), the second receiver (such as the right receiver 146) and the third receiver (such as the left receiver 144) continuously search the guiding signal ST till the guiding signal ST received by the central receiver 142 is largest among the guiding signals ST received by the three receivers, the robot 140 stops spinning and stays at the position P12. At this moment, it represents that the position P12 of the robot is approximately towards the base station 120, and it nears the virtual center line AX of the base station 120. Thus, the central receiver 142 is nearest to the transmitter 122 and the strength of the guiding signal ST received by the central receiver 142 is a maximum. Then, the robot 142 only needs to have a fine timing in bypassing to return to the base station to have a charge.

As shown in FIG. 3B, before the robot 140 bypasses, if the strength of the guiding signal ST received by the right receiver 146 is smaller than the strength of the guiding signal ST received by the left receiver 144 (at this moment, the robot 140 faces towards the base station 120), the robot 140 bypasses toward right. When the robot 140 bypasses, the change of the strength of the guiding signal received by the central receiver 142 is continuously detected. As shown in FIG. 3B, when the robot 140 bypasses toward right, the robot 140 is close to the base station 120 gradually, and the strength of the guiding signal ST received by the central receiver 142 is increased gradually (from low to high), it represents that the robot moves in the right direction and it is gradually closer to the base station. Then, when the robot 140 passes the central line in front of the base station 120 and moves on, the strength of the guiding signal ST received by the central receiver 142 decreases (from high to low) or is reduced to zero, it represents that the robot moves in the right direction and the robot is gradually away from the base station. At the moment, the robot 140 stops moving immediately and stays at the position P20, as shown in FIG. 3B, the position of the robot 140 is toward the right side R of the base station 120. The position P10 is close to the virtual central line AX of the base station 120. The bypassing and spinning of the robot 140 in FIG. 3B is similar to those in the embodiment in FIG. 3A, which is omitted herein.

Furthermore, as shown in FIG. 3A and FIG. 3B, the robot 140 bypasses along a curved trace 1 or 2 till the strength of the guiding signal ST received by the central receiver 142 decreases and are reduced to zero, and the robot 140 stays at the position P10 or P20, respectively. After the bypassing, the robot 140 is gradually closer to the virtual central line AX, and the robot turn to the left side L or the right R of the base station 120. In the moving process after a period, when the strength of the guiding signal ST received by the central receiver 142 decreases or is reduced to zero, it represents that the receiving orientation of the central receiver 142 and the transmitting orientation of the transmitter 122 is staggered, the robot stops moving and spins.

When the robot spins, the first receiver (such as the central receiver 142), the second receiver (such as the right receiver 146) and the third receiver (such as the left receiver 144) search the guiding signal ST continually till the strength of the guiding signal ST received by the central receiver 142 is largest among the guiding signals ST received by the three receivers, the robot 140 stops spinning and stays at the position P12 or P22. The positions P12 and P22 representing the position of the robot are approximately toward the base station 120, the position of the robot 140 is toward the base station 120 and close to the virtual central line AX of the base station 120. Then, the robot 142 can return to the base station and have a charge by a fine tune. When the robot 140 bypasses, the direction of moving is corrected according to the change of the strength of the guiding signal ST received by the central receiver 142 to avoid that the robot moves in the wrong direction and it is gradually away from the base station 120.

Figure 4A:
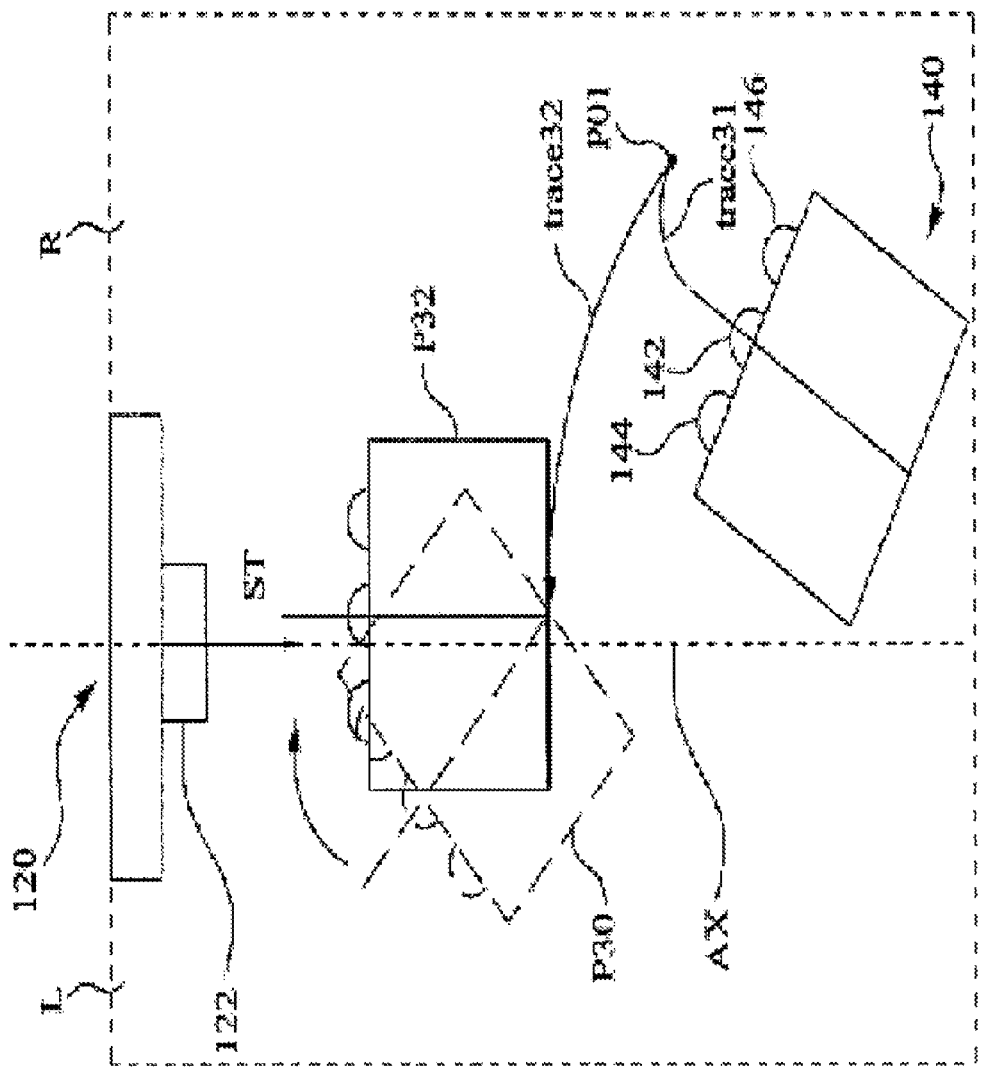
FIG. 4A is a schematic diagram showing that the robot in FIG. 1 bypasses relative to the base station from a third position.
Figure 4B:
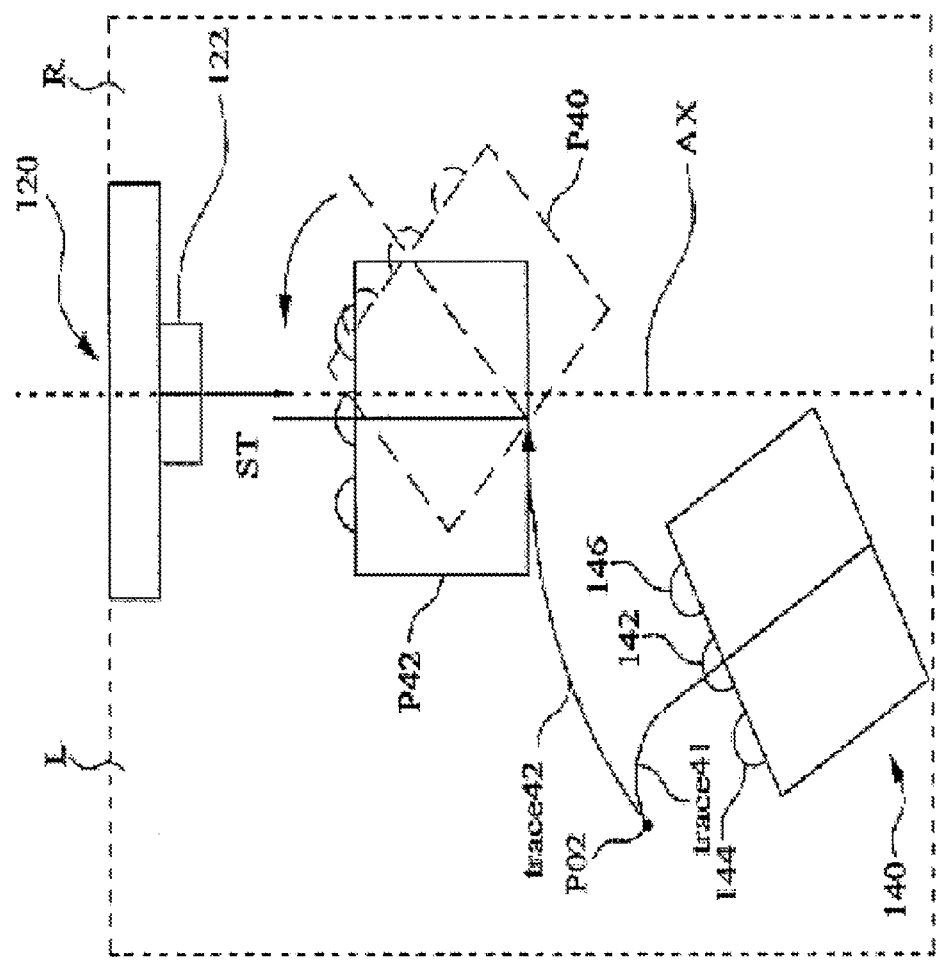
FIG. 4B is a schematic diagram showing that the robot in FIG. 1 bypasses relative to the base station from a fourth position.

FIG. 4A and FIG. 4B are schematic diagrams showing that the robot in FIG. 1 bypasses relative to the base station from a third position and a fourth position. As shown in FIG. 4A, before the robot 140 bypasses, when the strength of the guiding signal ST received by the right receiver 146 is smaller than the strength of the guiding signal ST of the left receiver 144 (the robot 140 does not face toward the base station 120), the robot 140 bypasses toward right (the direction of trace 31).

The robot 140 bypasses according to the determined direction, in the bypass process, the change of the strength of the guiding signal ST received by the central receiver 142 is detected. As shown in FIG. 4A, when the robot 140 bypasses along the curved trace 31 and the robot 140 moves toward left, it represents that the robot 40 gradually moves away from the base station 120, the strength of the guiding signal ST received by the central receiver 142 decreases (from high to low, that is the moving direction is wrong), the robot 140 moves in the wrong direction and it is gradually away from the base station. At the moment, the robot 140 stops bypassing, and the robot 140 changes to bypass along a curved trace 32.

Then, in the process of bypassing along a curved trace 32, the change of the strength of the guiding signal ST received by the central receiver 142 is detected. When the strength of the guiding signal ST received by the central receiver 142 is increased gradually (from low to high), it represents that the robot moves in the right direction and it is gradually closer to the base station. Then, the robot 140 passes the central line of the base station 120 and moves on, when the strength of the guiding signal ST received by the central receiver 142 increases or is reduced to zero (it represents that the robot moves in the right direction, and it gradually moves away from the base station), the robot 140 stops bypassing and stays at the position P30 toward the left side L of the base station 120, the position P30 is near the virtual central line AX of the base station 120. After stopping moving, the robot 140 spins at the position P30 (such as the direction as the clockwise arrow shown in FIG. 4A). In the process of spinning, the first receiver (such as the central receiver 142), the second receiver (such as the right receiver 146) and the third receiver (such as the left receiver 144) continually search the guiding signal ST again till the guiding signal ST received by the central receiver 142 is largest among the guiding signals ST received by the three receivers, and the robot 140 stops spinning. At the moment, the position of the robot is approximately toward the base station 120, and the position of the robot 140 is near the virtual central line AX of the base station 120. The spinning operation of the embodiment in FIG. 4A is similar to those in the embodiment in FIG. 3A, which is omitted.

In FIG. 4B, before the robot 140 spins, when the strength of the guiding signal ST received by the right receiver 146 is larger than the strength of the guiding signal ST received by the left receiver 144 (at the time, the robot 140 is not toward the base station 120), the robot 140 determines to bypass toward left (the direction of the trace 41). Then, when the robot 140 bypasses, the change of the strength of the guiding signal ST received by the central receiver 142 is continuously detected. As shown in FIG. 4B, when the robot 140 bypasses along a curved trace 41, the robot 140 moves towards left, it represents that the robot 140 gradually moves away from the base station 120, the strength of the guiding signal ST received by the central receiver 142 decreases from strong to weak (or from high to low, that is the bypass direction is wrong), the robot moves in the wrong direction and it is gradually far away from the base station. At the moment, the robot stops bypassing and the robot 140 changes to bypass along a curved trace 42.

Then, when the robot 140 bypasses along a curved trace 42, the change of the strength of the guiding signal ST received by the central receiver 142 is detected, the robot 140 is gradually closer to the base station 120. The strength of the guiding signal ST received by the central receiver 142 increases gradually (from low to high), it represents that the robot moves in the right direction and moves closer to the base station gradually. Then, the robot 140 passes the central line of the base station 120 and moves on when the strength of the guiding signal ST received by the central receiver 142 decreases or is reduced to zero (it represents that the robot moves in the right direction and it is gradually far away from the base station), the robot 140 stops bypassing immediately, stays at the position P30, and faces toward the right side R of the base station 120, the position P30 is near the virtual central line AX of the base station 120.

After stopping bypassing, the robot 140 spins at the position P40 (such as the direction of the clockwise arrow shown in FIG. 4B), the first receiver (such as the central receiver 142), the second receive (such as the right receiver 146) and the third receiver (such as the left receiver 144) search the guiding signal ST continually again till the strength of the guiding signal ST received by the central receiver 142 is largest among the guiding signals ST received by the three receivers, and then the robot 140 stops spinning. At the moment, the position of the robot is toward the base station 120; the position of the robot 140 is toward the base station 120 and near the virtual central line AX of the base station 120. The spinning operations in the embodiments in FIG. 4A and FIG. 4B are similar to those in the embodiment in FIG. 3A, which is omitted herein.

Based on above, by the bypassing operation of the robot 140 shown in FIG. 3A and FIG. 3B, the robot 140 gradually moves closer to the base station 120. Moreover, by the bypassing operation of the robot 140 shown in FIG. 4A and FIG. 4B, even the robot 140 bypasses towards the direction away from the base station 120, the robot 140 also can change the bypass direction and move towards the virtual central line AX and the base station 120. In addition, the correction mode and the correction times of the robot 140 are not limited at those in FIG. 4A and FIG. 4B. In other words, the robot 140 can bypass and spin by reciprocating at two sides of the robot 140 repeatedly to move closer to the base station 120.

The robot 140 can determine its position more accurately by correcting the determining result according to various positioning settings (such as visual recognition or virtual map building methods). In other words, the robot 140 can correct the route of the robot 140 by auxiliary positioning settings, which is not limited to the embodiments in FIG. 4A to FIG. 4B.

Figure 5A:
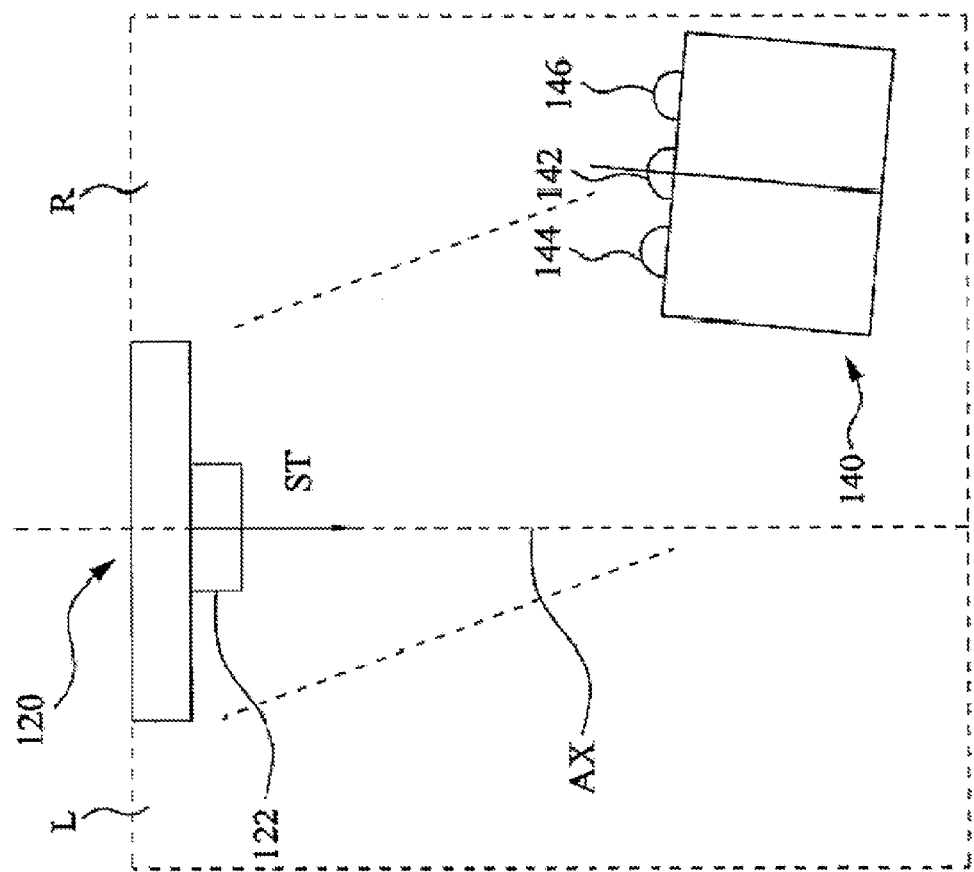
FIG. 5A is a schematic diagram showing that the robot in FIG. 1 bypasses relative to the base station from a fifth position.

Except positions of the robot 140 in FIG. 3A, FIG. 3B, FIG. 4A and FIG. 4B, the robot 140 also may stay at some positions where some receivers of the robot 140 may not receive the guiding signal ST before the bypassing, which is not limited herein. FIG. 5A and FIG. 5B are schematic diagrams showing that the robot in FIG. 1 bypasses corresponding to the base station from a fifth position and a sixth position.

As shown in FIG. 5A, since the robot 140 is deviated from the virtual central line AX too large, only the left receiver 144 of the robot 140 can receive the guiding signal ST. In other words, the strength of the guiding signals ST received by the left receiver 144 is larger than the strength of the guiding signal ST received by the right receiver 146. The operation of the robot 140 is similar to that in FIG. 4A, which is omitted. The detail of the embodiment in FIG. 5B is similar to that of the embodiment in FIG. 5A, which is omitted.

In the embodiment, after the robot 140 stops spinning, the robot 140 moves toward the base station 120 while adjusting the direction and velocity of the robot.

For example, as shown in FIG. 1, the robot 140 further includes a left wheel 147 and a right wheel 149, the robot 140 can control the speed difference between the left wheel 147 and the right wheel 149 to adjust the moving direction according to the strength of the guiding, signals ST received by the left receiver 144 and the right receiver 146. The strength difference of the guiding signals ST received by the left receiver 144 and the right receiver 146 is smaller than a migration threshold to ensure that one side of the robot 140 configuring with the receiver faces the base station 120 in moving, it avoids that the robot 140 askew moves into the base station 120.

Furthermore, as shown in FIG. 1, the robot 140 controls the spinning speed to adjust the moving speed according to the strength of the guiding signal ST received by the central receiver 142, therefore, the robot 140 gradually reduces the moving speed when the strength of the guiding signal ST received by the central receiver 142 is gradually stronger, it avoids that excessive action increases the correcting time and the robot 140 collides the base station 120.

When the robot 140 stops spinning and move towards the base station 120, if the strength difference of the guiding signals ST received by the left receiver 144 and the right receiver 146 is larger than a migration threshold (the strength of the guiding signal ST received by the central receiver 142 is larger than a central migration threshold), the robot 140 corrects the trace till the strength of the guiding signals ST received by the left receiver 144 and the right receiver 146 is approximate (that is, the strength difference of the guiding signals ST received by the left receiver 144 and the right receiver 146 is smaller than the migration threshold) or the time for correcting the trace is over a preset time (it avoids wasting too much time in correcting). As a result, the moving direction of the robot 140 can be corrected at any time in moving toward the base station 120 to make the robot enter into the base station 120 accurately.

In the condition that the strength of the guiding signal ST of the central receiver 142 is larger than the central receiving threshold and the strength difference of the guiding signal ST received by the left receiver 144 and the right receiver 146 is smaller than the migration threshold, the robot 140 can continue to move towards the base station 120. Therefore, the moving direction of the robot 140 can be confirmed at any time when the robot moves toward the base station 120 to make the robot enter the base station 120 accurately.

The robot 140 further includes a collision sensor 148, as shown in FIG. 1. The collision sensor 148 is triggered when the robot 140 collides with the base station 120 to make the robot 140 stop moving. The robot 140 further includes a signal transmitting component 141, as shown in the signal transmitting component 141 transmits a continuous signal to start the base station 120 to charge the robot 140 when the robot 140 returns the base station 120. The signal transmitting component 141 can be a "drop off" sensor disposed in the base plate of the robot 140, which is not limited herein, in other words, the signal transmitting component 141 can be disposed at any part of the robot 140.

The guiding signal and the continuous signal may be an infrared-radiation (IR) signal, an un-modulated signal, a modulated signal, a pulse width modulation (PWM) signal or other wireless signals, which is not limited herein.

Figure 6A:
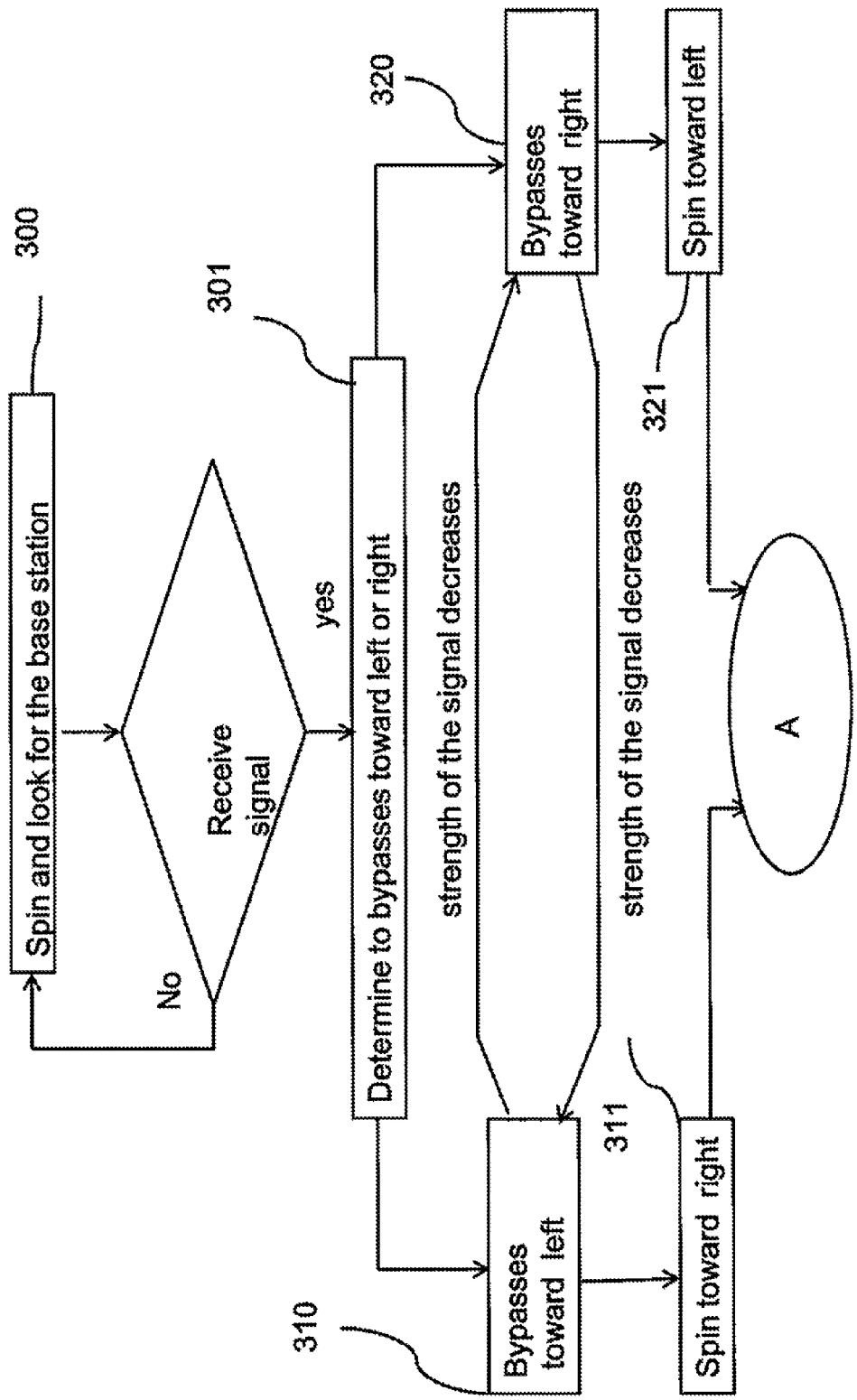
FIG. 6A and FIG. 6B are schematic diagrams showing operation procedures of a robot device in an embodiment of the disclosure.
Figure 6B:
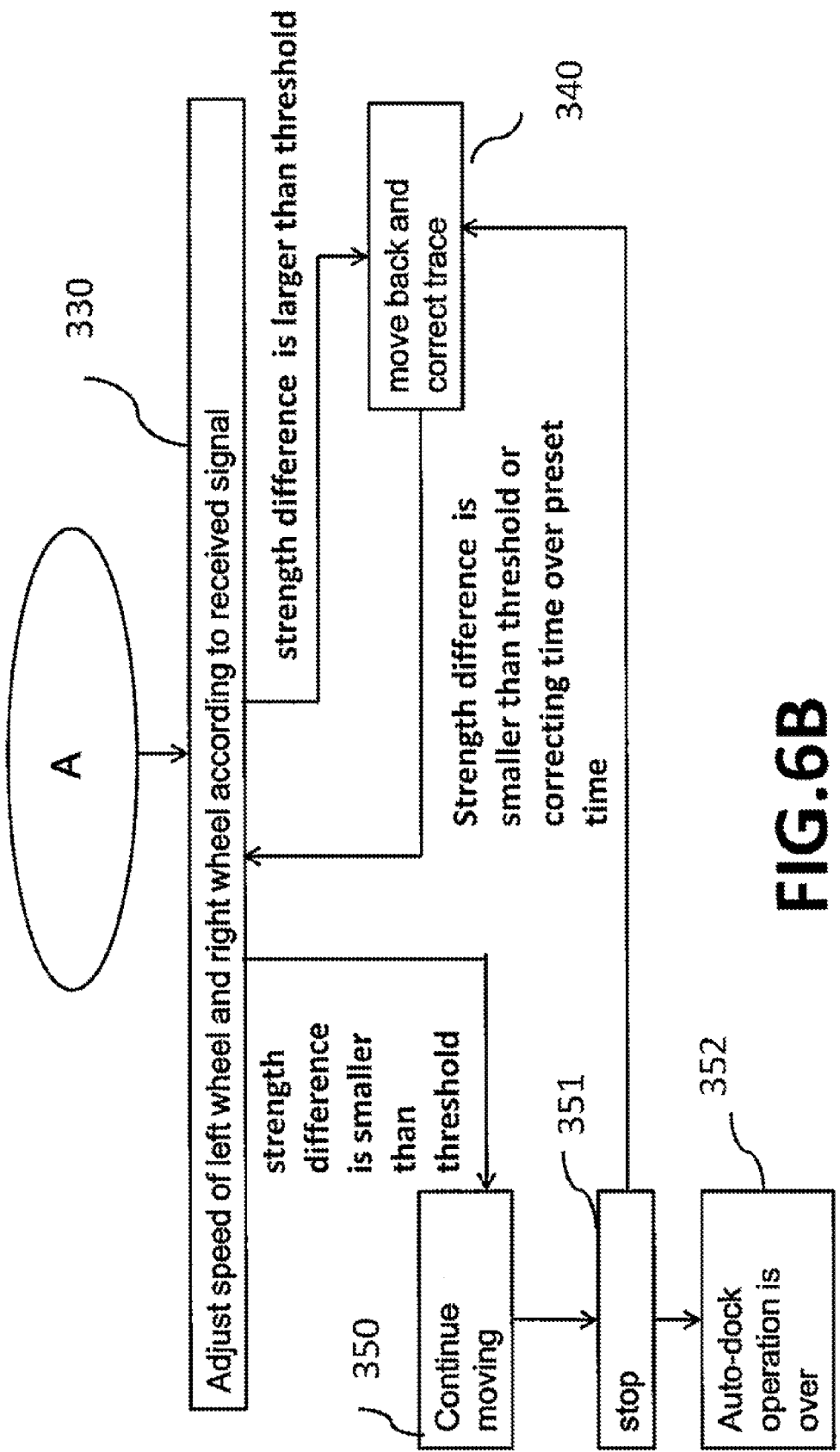

FIG. 6A and FIG. 6B are schematic diagrams showing operation procedures of the robot device. The operation procedures shown in FIG. 6A and FIG. 6B can be applied to the robot device 10 shown in FIG. 1, which is not limited.

As shown in FIG. 6A, if all of the central receiver 142, the left receiver 144 and the right receiver 146 do not receive the guiding signal ST, the robot 140 spins to look for the base station 120 till one of the central receiver 142, the left receiver 144 and the right receiver 146 receive the guiding signal ST (step 300).

Then, the robot 140 is determined to bypass towards left or right according to the guiding signals ST received by the left receiver 144 and the right receiver 146 (step 301).

When the strength of the guiding, signal ST received by the right receiver 146 is larger than the strength of the guiding signal ST received by the left receiver 144, the robot 140 bypasses towards left. When the strength of the guiding signal ST received by the right receiver 146 is smaller than the strength of the guiding signal ST received by the left receiver 144, the robot 140 bypasses towards right of the robot 140.

Then, the robot 140 bypasses to the position in front of the base station 120 along the determined bypass direction (step 320 or 310) according to step 310. As shown in FIG. 3A, the robot 140 bypasses towards left according to the determined bypass direction. Since the bypass direction is correct, the strength of the guiding signal ST received by the central receiver 142 increases continuously, the robot 140 continues bypassing till the strength of the guiding signal ST received by the central receiver 1422 increases first and then decreases, the robot 140 stops at the position P10 (step 310). As shown in FIG. 3B, the robot 140 bypasses towards right side R according to the determined moving direction. Since the moving direction is correct, the strength of the guiding signal ST received by the central receiver 142 gradually increases, the robot 140 continues bypassing till the strength of the guiding signal ST received by the central receiver increases first and then decreases, the robot 140 stops at the position P20 (step 320). The bypassing operation is similar to that in the embodiments in FIG. 3A and FIG. 3B, which is omitted herein.

As shown in FIG. 4A, since the robot 140 determines to bypass towards right of the robot 140 in step 301 (the strength of the guiding signal ST received by the right receiver 146 is smaller than the strength of the guiding signal ST received by the left receiver 144) the robot 140 bypasses toward right of the robot 140 according to determining result (step 320). However, since the moving direction is wrong, the robot 140 gradually moves away from the base station 120 and the strength of the guiding signal ST received by the central receiver 142 gradually decreases. At this moment, the robot 140 moves from the position P01 to the opposite direction corresponding to the original moving direction (in other words, the robot 140 moves around a curve to the left).

Since the corrected bypass direction is right, the strength of the guiding signal ST received by the central receiver 142 increases continuously, at this moment, the robot 140 continues bypassing till the strength of the guiding signal ST received by the central receiver 142 increases first and then decreases, and the robot 140 stops at the position P30.

As shown in FIG. 4B, since the robot 140 determines to bypass towards left in step 301 (the strength of the guiding signal received by the right receiver 146 is larger than the strength of the guiding signal ST received by the left receiver 144), the robot 140 bypasses towards left of the robot 140 according to the determining result (step 310). However, since the moving direction is wrong, the robot 140 gradually moves away from the base station 120 to make the strength of the guiding signal ST received by the central receiver 142 decreases continually, the robot 140 bypasses towards right (step 320). The operation of changing the moving direction according to the strength of the guising signal is similar to that of the embodiments in FIG. 4A and FIG. 4B, which is omitted herein.

After step 310 or step 320, the robot 140 stops bypassing and spins till the strength of the guiding signal ST received by the central receiver 142 is a maximum (step 311 or step 321). As shown in FIG. 3A, the robot 140 spins from the position P10 toward right (clockwise) to the position P12 (step 311) after bypassing. As shown in FIG. 3B, the robot 140 spins from position P20 to the left (counterclockwise) to position P22 (step 321), the spinning operation is similar to that of the embodiments in FIG. 3A and FIG. 3B, which is omitted herein.

After step 311 or step 321, the procedures shown in FIG. 6B are after the procedures shown in FIG. 6A. As shown in M0B, the robot 140 stops spinning and moves towards the base station 120. The robot 140 controls the spinning speed of the left wheel 147 and the right wheel 149 to adjust the moving speed according to the strength of the guiding signal ST received by the central receiver 142 (step 330). The robot 140 can slow down the moving speed gradually when the strength of the guiding signal ST received by the central receiver 142 increases, it avoids that excessive action increases correcting time and the robot 140 collides the base station 120.

Furthermore, in step 330, the robot 140 can also control the difference of the spinning speeds of the left wheel 147 and the right wheel 149 according to the strength of the guiding signals ST received by the left receiver 144 and the right receiver 146, and the strength difference of the guiding signals ST received by the left receiver 144 and the right receiver 146 is smaller than a migration threshold, it ensures that one side disposed with receivers of the robot 140 faces the base station 120 to avoid that the robot 140 is askew into the base station 120.

When the strength of the guiding signal ST received by the central receiver 142 is larger than the central receiving threshold and the strength difference of the guiding signals ST received by the left receiver 144 and the right receiver 146 is smaller than the migration threshold, the robot 140 continues moving to the base station 120 (step 350). The robot 140 keeps moving, towards the base station 120 till the collision sensor 148 is triggered when the robot 140 collides the base station 120.

When the collision sensor 148 of the robot 140 is triggered, the robot 140 enters into the base station 120 and stops moving (step 351). Then, the signal transmitting component 141 of the robot 140 sends a continuous signal to make the base station 120 charge the robot 140 when the robot 140 return to the base station 120. The robot 140 determines that whether the base station 120 charges the robot 140 normally (such as the robot 140 detects that whether the mental power supply contacts of the base station 120 has power). When the base station 120 provides power to the robot 140 normally, the auto-docking operation of the robot 140 is over (step 352).

On the contrary, if the base station 140 does not provide power to the robot 120, it represents that the robot 140 does not direct at the charging position, the robot 140 moves back and corrects the trace (step 340).

When the robot 140 stops spinning to move towards the base station 120 and the robot 140 adjusts the spinning speed of the left wheel 147 and the right wheel 149 according to the guiding signal ST (step 330), if the strength of the guiding signal ST received by the central receiver 142 is larger than the central receiving threshold and the strength difference of the guiding signals ST received by the left receiver 144 and the right receiver 146 is larger than the migration threshold, the robot 140 moves back and corrects the trace (step 340) till the strength difference of the guiding signal ST received by the left receiver 144 and the right receiver 146 is smaller than the migration threshold or the time for correcting the trace of the robot 140 is larger than a preset time. Then, the robot 140 continues adjusting the spinning speed of the left wheel 147 and the right wheel 149 to move toward the base station 120 (step 330).

Although the disclosure has been described in considerable detail with reference to certain preferred embodiments thereof, the disclosure is not for limiting the scope. Persons having ordinary skill in the art may make various modifications and changes without departing, from the scope. Therefore, the scope of the appended claims should not be limited to the description of the preferred embodiments described above.

What is claimed is:

1. A robot device, comprising:
   a base station used for transmitting a guiding signal; and
   a robot including a first receiver, a second receiver and a third receiver, wherein the first receiver, the second receiver and the third receiver are used to receive the guiding signal, the second receiver and the third receiver are disposed at right and left of the first receiver of the robot at different angles, respectively;
   wherein the robot determines to bypass towards right or left according to the guiding signals received by the second receiver and the third receiver; and
   in the bypassing of the robot, the robot stops bypassing at a first position when the strength of the guiding signal received by the first receiver decreases or is reduced to zero,
   wherein when the strength of the guiding signal received by the second receiver is larger than the strength of the guiding signal received by the third receiver, the robot bypasses towards left, the robot keeps bypassing when the strength of the guiding signal received by the first receiver continually increases, and the robot stops bypassing when the strength of the guiding signal received by the first receiver decreases;
   wherein when the strength of the guiding signal received by the second receiver is smaller than the strength of the guiding signal received by the third receiver, the robot bypasses toward right, and the robot keeps bypassing when the strength of the guiding signal received by the first receiver gradually increases, and the robot stops at the first position when the guiding signal received by the first receiver decreases.

2. The robot device according to claim 1, wherein in the bypassing of the robot, the robot stops bypassing and turns to bypass at another side of the robot when the guiding signal received by the first receiver gradually decreases.

3. The robot device according to claim 2, wherein when the strength of the guiding signal received by the second receiver is smaller than the strength of the guiding signal received by the third receiver, the robot bypasses toward the right of the robot, when the strength of the guiding signal received by the first receiver continuously decreases, the robot turns from a second position to bypass toward the left of the robot till the strength of the guiding signal received by the first receiver first increases and then diminishes, and then the robot stops bypassing at the first position.

4. The robot device according to claim 3, wherein after the robot stops bypassing, the robot spins till the strength of the guiding signal received by the first receiver is a maximum in spinning, and then the robot stops spinning.

5. The robot device according to claim 2, wherein when the strength of the guiding signal received by the second receiver is larger than the strength of the guiding signal received by the third receiver, the robot bypasses towards left, when the strength of the guiding signal received by the first receiver gradually decreases, the robot turns from the second position to bypass toward the right of the robot till the strength of guiding signal received by the first receiver increases firstly and then decreases, and then the robot stops bypassing at the first position.

6. The robot device according to claim 5, wherein after the robot stops bypassing, the robot spins till the strength of the guiding signal received by the first receiver is a maximum in spinning.

7. The robot device according to claim 1, wherein the robot spins when the robot stops bypassing at the first position, and the robot spins till the strength of the guiding signal received by the first receiver is a maximum value in spinning, and then the robot stops spinning.

8. The robot device according to claim 1, wherein after the robot stops bypassing, the robot spins till the strength of the guiding signal received by the first receiver is a maximum in spinning, and then the robot stops spinning.

9. The robot device according to claim 1, wherein the robot bypasses along a curved trace.

10. The robot device according to claim 1, wherein the robot further includes a collision sensor, and the collision sensor is triggered to stop the robot when the robot collides the base station.

11. The robot device according to claim 1 wherein the robot further includes a signal transmitting element used for transmitting a continuous signal to start the base station to charge the robot when the robot docks with the base station.

12. The robot device according to claim 1, wherein after the robot stops spinning, the robot moves towards the base station while adjusting direction and speed.

13. The robot device according to claim 12, wherein after the robot stops spinning, when the robot moves towards the base station, the direction in moving forward is adjusted according to the strength of the guiding signals received by the second receiver and the third receiver, so as to make the strength difference of the guiding signals received by the second receiver and the third receiver is smaller than a threshold.

14. The robot device according to claim 12, wherein after the robot stops spinning, the moving speed is adjusted according to the strength of the guiding signal received by the first receiver when the robot moves towards the base station.

15. The robot device according to claim 12, wherein when the robot stops spinning and moves towards the base station, the robot corrects a bypass trace when the strength difference of the guiding signals received by the second receiver and the third receiver is larger than the threshold, and the robot does not stop correcting the trace until the strength difference of the guiding signal received by the second receiver and the third receiver is smaller than the threshold or the time for correcting the trace is over a preset time.

* * * * *